United States Patent [19]

McGovern

[11] Patent Number: 5,536,307
[45] Date of Patent: Jul. 16, 1996

[54] PAVEMENT REJUVENATOR AND DRESSING CONDITIONER EMULSIONS AND JELLIES

[75] Inventor: Edward W. McGovern, Pittsburgh, Pa.

[73] Assignee: K.A.E. Paving Consultants, Inc., Wexford, Pa.

[21] Appl. No.: 429,579

[22] Filed: Apr. 27, 1995

[51] Int. Cl.$^6$ ................................................. C09D 195/00
[52] U.S. Cl. ................................................................ 106/277
[58] Field of Search ............................................... 106/277

[56] References Cited

U.S. PATENT DOCUMENTS

| | | | |
|---|---|---|---|
| 3,221,615 | 12/1965 | McGovern | 94/23 |
| 3,261,269 | 7/1966 | McGovern | 94/23 |
| 3,912,669 | 10/1975 | Hendrix | 106/277 |
| 4,405,375 | 9/1983 | Gibson et al. | 106/277 |
| 4,661,378 | 4/1987 | McGovern | 106/277 |
| 5,268,029 | 12/1993 | Demangeon et al. | 106/277 |

*Primary Examiner*—David Brunsman
*Attorney, Agent, or Firm*—Webb Ziesenheim Bruening Logsdon Orkin & Hanson

[57] ABSTRACT

A pavement rejuvenating and/or conditioning composition in the form of an aqueous-based emulsion or jelly. More particularly, bituminous pavement rejuvenators and pavement dressing conditioners are made into emulsions or jellies by agitating the rejuvenators and/or conditioners in cationically- nonionic or anionically-modified aqueous solvents. These solvents include aqueous polyvinylalcohol; polyoxyalkylenes aqueous amines; aqueous compounded amines such as those available from Akzo Chemicals and sold under the tradename Redicote (i.e., Redicote E-9) or those available from B. F. Goodrich Chemical Co. and sold under the tradename Carbopol; and aqueous solutions of aliphatic fatty acids and caustic (usually sodium hydroxide). When the emulsifying agent concentration in the solution is increased, the solution may be used to form jellied products, whereas more dilute aqueous solutions of the emulsifying agents are suitable for preparing lower viscosity emulsions of the rejuvenating and conditioning compositions.

11 Claims, No Drawings

PAVEMENT REJUVENATOR AND DRESSING CONDITIONER EMULSIONS AND JELLIES

FIELD OF THE INVENTION

The invention relates to improvements in pavement rejuvenator and dressing conditioner compositions by creating aqueous-based emulsions and paving jellies based upon them.

BACKGROUND OF THE INVENTION

Pavement creation and preservation is a technology which has a long history, but only recently have new demands and constraints forced widespread changes in this industry. Environmental protection pressures have eliminated many otherwise tried-and-true materials and solvents for use as pavement constituents. At the same time, roads and other paved surfaces are experiencing the stresses of greater traffic and larger, heavier vehicles and the paving industry must therefore meet commensurately higher paving quality specifications with new, environmentally acceptable materials—and still do so in a commercially competitive way.

One way to preserve the integrity of paved surfaces is to maintain them, so as to avoid the necessity of rebuilding or resurfacing them. A bituminous pavement rejuvenator for such a purpose is disclosed in U.S. Pat. No. 3,221,615, incorporated herein by reference, which is a coal tar derivative composition containing specific ingredients and having particular specifications. Other pavement treating compositions are disclosed in U.S. Pat. Nos. 3,261,269 and 4,661,378, also incorporated herein by reference, which disclose pavement dressing conditioners which contain the above-described bituminous pavement rejuvenator together with additional ingredients and/or solvents. These pavement treating compositions are generally spread or sprayed onto existing pavement surfaces (not only bituminous surfaces but concrete and other surfaces as well) to preserve and to restore the integrity of the pavement.

Even these pavement preserving and restoring compositions, however, do not meet all the needs of the current pavement maintenance industry. They do not generally permeate the surface to be treated fast enough, or at least cannot be relied upon to stay in place despite stresses such as flowing water (from land or air) or restored vehicular traffic. Existing pavement treating compositions are not noted, either, for their ability reliably to fill cracks in bituminous pavement or to yield long wear in such repairs.

Also, an important environmental innovation is the substitution of water for organic solvents as a large component of pavement treating materials. This obvious goal is difficult to meet, however, due to the apparent water insolubility of paving materials generally.

Therefore, a need remains for a composition which can be used to maintain—or to repair—pavement, which has all the advantages of prior art conditioners and rejuvenators but can also be prepared using aqueous or aqueous-based solvents. Such a composition should provide long lasting pavement crack repair, give good resistance to weather soon or immediately after application, and allow for prompt restoration of the pavement to its normal use.

SUMMARY OF THE INVENTION

In order to meet this need, the present invention is a pavement rejuvenating and/or conditioning composition in the form of an aqueous-based emulsion or jelly. More particularly, bituminous pavement rejuvenators and pavement dressing conditioners are made into emulsions or jellies by agitating the rejuvenators and/or conditioners in cationically- or anionically-modified aqueous solvents. These solvents include aqueous polyvinylalcohol; aqueous amines; aqueous compounded amines such as those available from Akzo Chemicals and sold under the tradename Redicote (i.e., Redicote E-9) or those available from B. F. Goodrich Chemical Co. and sold under the tradename Carbopol; and aqueous solutions of aliphatic fatty acids and caustic (usually sodium hydroxide). When the emulsifying agent concentration in the solution is increased, the solution may be used to form jellied products, whereas more dilute aqueous solutions of the emulsifying agents are suitable for preparing lower viscosity emulsions of the rejuvenating and conditioning compositions.

DETAILED DESCRIPTION OF THE INVENTION

In accordance with the present invention, bituminous pavement rejuvenators and pavement dressing conditioners are made into emulsions or jellies by agitating the rejuvenators and/or conditioners in aqueous cationic nonionic or anionic emulsifying agents. These emulsifying agents include aqueous polyvinylalcohol; aqueous amines; aqueous compounded amines such as those available from Akzo Chemicals and sold under the tradename Redicote (i.e., Redicote E-9) or those available from B. F. Goodrich Chemical Co. and sold under the tradename Carbopol; and aqueous solutions of aliphatic fatty acids and caustic (usually sodium hydroxide). When the emulsifying agent concentration in the solution is increased, the solution may be used to form jellied products, whereas more dilute aqueous solutions of the emulsifying agents are suitable for preparing lower viscosity emulsions of the rejuvenating and conditioning compositions.

When relatively greater concentrations of the emulsifying agent (the polyvinylalcohol, amine-based compound or hydroxyl-ion containing compounds) are used to emulsify the bituminous pavement rejuvenator (BPR) or pavement dressing conditioner (PDC), viscous jellies result instead of low viscosity aqueous emulsions or dispersions. In theory, although it is not intended that the invention be bound by this theory, as the concentration of the emulsifying agent in the aqueous solution increases, the droplet size of the PDC or BPR decreases. Decreased droplet size provides more droplet surface area requiring aqueous interface and, as the available water "spreads out" more, the viscosity of the emulsion increases to that of a jelly. Regardless of the theory, however, the jellied BPR and PDC according to the present invention have unique properties and special utilities, as described in greater detail below. Notwithstanding this, however, the jellies are merely higher viscosity emulsions than the lower-viscosity compositions generally referred to as "emulsions" herein, with the only differences being viscosity and utility.

Pavement rejuvenating and conditioning compositions are disclosed in U.S. Pat. Nos. 3,221,615, 3,261,269 and 4,661,378 (now Reexamination Certificate 4,661,378) incorporated herein by reference. It is helpful in the context of this specification, however, to provide the following summary of these rejuvenating and conditioning compositions, so as to make the claimed invention more clear.

The bituminous pavement rejuvenator disclosed in U.S. Pat. No. 3,221,615 is a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield viscosity at 25° C. of 30 cps, and an initial boiling point of at least 180° C. and a continuous boiling range to at least 300° C., 70–40% by volume of the material remaining as residue at 300° C. (together with additional specifications). The rejuvenator is disclosed as at least primarily intended to rejuvenate all types of bituminous pavements, namely, asphalt roads, airport pavements and parking areas. The patent identifies the ability of the composition to plasticize the binder of the bituminous pavement as the assumed basis for its utility, and states that "[i]t has been found that the paving treated in accordance with this invention exhibits characteristics similar to those of a new pavement" and that "the pavement regains its ability to heal cracks under traffic and previously curled surfaces flatten under traffic," or in other words "regains its cold flow properties." The composition is handled in the same manner as previously existing liquid bituminous materials, and may be sprayed either cold (ambient temperature above 40° F.) or heated if required to 150° F. onto the pavement surface to be treated in the amount of about 0.05 to 0.5 gallons per square yard surface.

The above-described bituminous pavement rejuvenator is itself an ingredient in the pavement dressing conditioner described in U.S. Pat. No. 3,261,269. The pavement dressing conditioner can be applied to asphalt, concrete and other paved surfaces and contains "road tar", coal tar and coal tar solvent in addition to bituminous pavement rejuvenator. When used to treat paved surfaces, this admixture is believed to restore the resilience of pavement which has otherwise started to harden and to crack, so as to prevent further cracking and even to restore the ability for self-healing of cracks to the existing pavement.

The pavement dressing conditioner described in Reexamination Certificate No. 4,661,378 is very similar to the pavement dressing conditioner disclosed in the '269 patent, except that it also includes a specialized solvent. This specialized solvent is an aromatic solvent having the following specifications: API Gravity @60° F. of from 11–30, Specific Gravity @60/60° F. of from 0.876–0.993, Distillation Range °F. of from 310–450 IBP (initial boiling point, ASTM: D86-62), to 350–550 DP (dry point, ASTM: D86-62) and a flash point °F. TCC of from 110–250.

Both pavement dressing conditioners and the bituminous pavement rejuvenator described above may be enhanced by dispersing them alone or together with aqueous emulsifying agents, to form emulsions or jellies. These emulsifying agents include aqueous polyvinylalcohol; aqueous amines; aqueous compounded amines such as those available from Akzo Chemicals and sold under the tradename Redicote (i.e., Redicote E-9) or those available from B. F. Goodrich Chemical Co. and sold under the tradename Carbopol; and aqueous solutions of aliphatic fatty acids and caustic (usually sodium hydroxide). Exemplary amines are commercially available primary aliphatic amines; trimethylaminediamines such as N-alkyl trimethylenediamine; polyethoxylated aliphatic amines and diamines ($C_8$ to $C_{18}$); amine acetate salts derived from primary, secondary or tertiary amines with the alkyl group ranging from $C_8$ to $C_{18}$; high molecular weight aliphatic primary, secondary or tertiary amines ($C_8$ to $C_{18}$); and quaternary ammonium salts containing one or two alkyl groups ranging from $C_8$ to $C_{18}$. Compounded amines are commercially available and are generally complexed or otherwise stabilized compositions with preserved amine functionality. Ionic aliphatic fatty acids include nonionic polyethoxylated fatty acid compositions available under the tradename Ethofat and other commercially available fatty acid, tall oil and tallow or animal fat ($C_{16}$ to $C_{18}$) based cationic emulsifiers.

In order to prepare a relatively low viscosity emulsion suitable for spraying onto pavement to be treated, aqueous solutions containing limited amounts of the emulsifying agent should be used. In the emulsification application, the aqueous polyvinylalcohol concentration should be about 1.0 to 6.0% by weight (of water); the aqueous fatty acid cation concentration should be about 0.5 to 10% by weight; and the aqueous amine concentration should be between about 0.2 and 4.0% by weight (which includes a small amount of acid—i.e., 0.2–0.8% by weight HCl—to dissociate the amine into the necessary cation) whether the amine derives from a known primary, secondary, tertiary or quaternary amine or from a commercial compounded amine of unknown formula.

In order to prepare a high viscosity jelly from PDC or BPR, suitable for spreading and retaining on difficult surfaces such as the insides of pavement cracks and the groundwater—exposed bases of telephone poles and dock pilings, aqueous solutions containing larger amounts of the emulsifying agent should be used. In the jellying application, the aqueous polyvinylalcohol concentration should be about 6.0 to 15% by weight (of water); the aqueous fatty acid cation concentration should be about 3.0 to 17% by weight; and the aqueous amine concentration should be between about 3 to 11% by weight (which includes a relatively small amount of acid—i.e., 0.8–2.5% by weight HCl—to dissociate the amine into the necessary cation), again regardless of whether the amine derives from a known primary, secondary, tertiary or quaternary amine or from a commercial compounded amine of unknown formula.

In order to create emulsions or jellies of the PDC and/or BPR compositions according to the present invention, the correct proportion of PDC and/or BPR and the aqueous emulsifying agent need only be combined in a suitable mixing apparatus. Stainless steel mixing tanks with mixing propellers are standard mixing apparatuses, but any inert mixing vessel and stirring or agitating means is adequate. No more than typical agitation is required to create the present emulsions or jellies. The actual amount of aqueous emulsifying agent used is the same regardless of whether the composition is intended to be an emulsion or a jelly: generally, 40–60% BPR or PDC is agitated with 40–60% of the aqueous emulsifying agent. Whether the result is an emulsion or a jelly depends upon the concentration of emulsifying agent, as explained above.

Compositions prepared according to the above description have enhanced properties over the bituminous pavement rejuvenators and pavement dressing conditioners known in the art. Their aqueous bases eliminate the use of noxious and environmentally unacceptable organic solvents in pavement treating compositions. They can be applied to wet surfaces—even underwater surfaces—without fear of run-off. The jellies are "crack-healers" which can conform into and fill cracks in asphalt and maintain their shape until they fully cure due to water evaporation. The lower viscosity dispersions give enhanced penetration into bituminous surfaces for faster processing and better pavement rejuvenation and conditioning.

Although the invention has been described with particularity above, the following examples illustrate specific embodiments of the above-described invention.

EXAMPLE 1

About 50% by weight of bituminous pavement rejuvenator prepared according to U.S. Pat. No. 3,221,615 was admixed, at a temperature of about 250° F., with an aqueous solution containing 3.0% Redicote E-9 compounded amine and about 1.0% HCl in a large stainless steel vessel equipped with an impeller mixer. The combined ingredients were agitated and a low viscosity emulsion resulted, which was transferred to a storage tank for storage at ambient temperature.

EXAMPLE 2

Topped coke oven tar (75–100 seconds Float Test at 50° C., 52.4% by weight) at a temperature of 180° F. was added to a mixing tank equipped with a three-bladed impeller. To the tank were then added, at ambient temperature, 11.6% by weight of B-T-X solvent and 20% by weight of crude heavy solvent naphtha (containing 50% resinifiable coumarone-indene resin). The mixture was stirred at 60 r.p.m. for 15 minutes and then 16.0% by weight of bituminous pavement rejuvenator (according to U.S. Pat. No. 3,221,615) at a temperature of 150° F. was added. The mixture was stirred for an additional 120 minutes in order to mix the ingredients thoroughly. Approximately 60% by weight of this pavement dressing conditioner (PDC) was combined at about 150° F. with 6.0% by weight polyvinylalcohol in water, with agitation, to yield an aqueous PDC emulsion.

EXAMPLE 3

Example 2 was repeated except a 15% by weight polyvinylalcohol solution was substituted for the 6.0% by weight polyvinylalcohol solution. After agitation, the PDC emulsified into a viscous jelly having the consistency of thick mayonnaise. The resulting composition adhered to the undersides of horizontal surfaces when applied thereto by spreading, and when those surfaces were exposed to water the composition did not wash or run off.

EXAMPLE 4

Example 1 was repeated except an aqueous solution containing about 4.0% by weight aliphatic fatty acid and about 0.03% sodium hydroxide was substituted for the amine/HCl emulsifyier, and a low viscosity BPR emulsion resulted.

EXAMPLE 5

Ninety-eight parts by weight H$_2$O were mixed with 1.0 part by weight Redicote E-9 and about 0.1 part by weight HCl, and the resulting solution was heated to 120° F. Fifty parts by weight of the solution were admixed with fifty parts by weight of PDC (prepared according to Example 2), the latter of which had been preheated to 150° F. A standard industrial colloid mill was used to emulsify the combined ingredients into a low viscosity emulsion.

Although the invention has been described with respect to stated materials and methods above, the invention is only to be limited insofar as is set forth in the accompanying claims.

What is claimed is:

1. An emulsified pavement treating conditioner comprising an aqueous emulsion of a quantity of bituminous pavement rejuvenator consisting of a coal tar derivative containing a mixture of di-, tri- and tetracyclic aromatic compounds and their alkyl homologs containing lower alkyl groups together with a quantity of phenolic and hydroxy derivatives, said mixture having a specific gravity at 25/25° C. of at least 1.08, a maximum Brookfield viscosity at 25° C. of 30 cps, and an initial boiling point of at least 180° C. and a continuous boiling range to at least 300° C., with 70–40% by volume of the material remaining as residue at 300° C., and an aqueous emulsifying agent to form individually dispersed droplets of bituminous pavement rejuvenator in suspension.

2. The emulsion according to claim 1 wherein said individually dispersed droplets of bituminous pavement rejuvenator additionally contain coal tar and coal tar solvent, within said droplets of said emulsion.

3. The emulsion according to claim 2 wherein said individually dispersed droplets of bituminous pavement rejuvenator further contain an aromatic solvent, within said droplets of said emulsion.

4. The emulsion according to claim 1 wherein said aqueous emulsifying agent is an aqueous solution containing between 0.5 and 15.0% by weight aliphatic fatty acid and between 0.1 and 1.5% by weight sodium hydroxide.

5. The emulsion according to claim 1 wherein said aqueous emulsifying agent is an aqueous solution containing 1.0 to 15.0% by weight polyvinylalcohol.

6. The emulsion according to claim 1 wherein said aqueous emulsifying agent is an aqueous solution containing 0.03 to 9.0% by weight amine and 0.2 to 2.5% by weight acid.

7. The emulsion according to claim 6 wherein said amine is a compounded amine.

8. The method of making an emulsion comprising agitating a quantity of bituminous pavement rejuvenator consisting essentially of a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield viscosity at 25° C. of 30 cps, and an initial boiling point of at least 180° C. and a continuous boiling range to at least 300° C., with 70–40% by volume of the material remaining as residue at 300° C., with an aqueous emulsifying agent to form individually dispersed droplets of bituminous pavement rejuvenator in suspension.

9. The method according to claim 8 wherein prior to agitating, the bituminous pavement rejuvenator is admixed with road tar, coal tar solvent and an aromatic solvent to form a pavement dressing conditioner, which is then emulsified.

10. The method according to claim 8 or 9 wherein the resulting emulsion is a liquid emulsion having high fluidity and a relatively low viscosity.

11. The method according to claim 8 or 9 wherein the resulting emulsion is a substantially solid jelly emulsion.

\* \* \* \* \*

(12) EX PARTE REEXAMINATION CERTIFICATE (8506th)
United States Patent
McGovern

(10) Number: US 5,536,307 C1
(45) Certificate Issued: Sep. 6, 2011

(54) PAVEMENT REJUVENATOR AND DRESSING CONDITIONER EMULSIONS AND JELLIES

(75) Inventor: Edward W. McGovern, Pittsburgh, PA (US)

(73) Assignee: K.A.E. Paving Consultants, Inc., Cranberry, PA (US)

Reexamination Request:
No. 90/009,762, Jun. 18, 2010

Reexamination Certificate for:
Patent No.: 5,536,307
Issued: Jul. 16, 1996
Appl. No.: 08/429,579
Filed: Apr. 27, 1995

(51) Int. Cl.
*C08L 95/00* (2006.01)
*E01C 7/00* (2006.01)
*E01C 7/35* (2006.01)

(52) U.S. Cl. .................................................. 106/277
(58) Field of Classification Search ............... None
See application file for complete search history.

(56) References Cited

U.S. PATENT DOCUMENTS

| | | |
|---|---|---|
| 2,190,604 A | 2/1940 | Montgomerie |
| 3,221,615 A | 12/1965 | McGovern |
| 3,261,269 A | 7/1966 | McGovern |
| 4,007,127 A | 2/1977 | Smadja |
| 4,661,378 A | 4/1987 | McGovern |
| 5,116,420 A | 5/1992 | Schneider |
| 5,224,990 A | 7/1993 | Vicenzi |

*Primary Examiner* — Elizabeth McKane

(57) ABSTRACT

A pavement rejuvenating and/or conditioning composition in the form of an aqueous-based emulsion or jelly. More particularly, bituminous pavement rejuvenators and pavement dressing conditioners are made into emulsions or jellies by agitating the rejuvenators and/or conditioners in cationically- nonionic or anionically-modified aqueous solvents. These solvents include aqueous polyvinylalcohol; polyoxyalkylenes aqueous amines; aqueous compounded amines such as those available from Akzo Chemicals and sold under the tradename Redicote (i.e., Redicote E-9) or those available from B. F. Goodrich Chemical Co. and sold under the tradename Carbopol; and aqueous solutions of aliphatic fatty acids and caustic (usually sodium hydroxide). When the emulsifying agent concentration in the solution is increased, the solution may be used to form jellied products, whereas more dilute aqueous solutions of the emulsifying agents are suitable for preparing lower viscosity emulsions of the rejuvenating and conditioning compositions.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *